(12) United States Patent
Shargots et al.

(10) Patent No.: US 9,336,910 B2
(45) Date of Patent: May 10, 2016

(54) CONTROL ROD/CONTROL ROD DRIVE MECHANISM COUPLINGS

(75) Inventors: Scott J. Shargots, Forest, VA (US); Paul K. DeSantis, Bentleyville, OH (US); John P. McLaughlin, North Royalton, OH (US); Mathew W. Ales, Issaquah, WA (US)

(73) Assignees: BWXT Nuclear Energy, Inc., Charlotte, NC (US); BWXT Nuclear Operations Group, Inc., Lynchburg, VA (US)

( * ) Notice: Subject to any disclaimer, the term of this patent is extended or adjusted under 35 U.S.C. 154(b) by 1373 days.

(21) Appl. No.: 12/899,739

(22) Filed: Oct. 7, 2010

(65) Prior Publication Data
US 2015/0206605 A1 Jul. 23, 2015

(51) Int. Cl.
G21C 7/06 (2006.01)
G21C 7/10 (2006.01)
G21C 7/12 (2006.01)
G21C 7/117 (2006.01)

(52) U.S. Cl.
CPC .. G21C 7/10 (2013.01); G21C 7/12 (2013.01); G21C 7/117 (2013.01); Y02E 30/39 (2013.01)

(58) Field of Classification Search
CPC .............. G21C 7/00; G21C 7/06; G21C 7/08; G21C 7/10; G21C 7/103; G21C 7/113; G21C 7/117
USPC ......... 376/207, 212, 219, 224, 226, 227, 239, 376/327
See application file for complete search history.

(56) References Cited

U.S. PATENT DOCUMENTS

| | | | |
|---|---|---|---|
| 3,769,160 A * | 10/1973 | Shepherd et al. | 376/339 |
| 3,959,072 A * | 5/1976 | Dupen | 376/237 |
| 4,038,137 A | 7/1977 | Pugh | |
| 4,073,684 A | 2/1978 | Cepkauskas | |

(Continued)

FOREIGN PATENT DOCUMENTS

| | | |
|---|---|---|
| CN | 102667951 | 9/2012 |
| JP | 2000-046980 | 2/2000 |

(Continued)

OTHER PUBLICATIONS

International Search Report and Written Opinion for PCT/US2011/051686 dated Jan. 17, 2012.

(Continued)

*Primary Examiner* — Marshall O'Connor
(74) *Attorney, Agent, or Firm* — Nelson Mullins Riley & Scarborough, LLP

(57) ABSTRACT

A nuclear reactor includes a pressure vessel, and a control rod assembly including at least one movable control rod comprising a neutron absorbing material, a control rod drive mechanism (CRDM) for controlling movement of the at least one control rod, and a coupling operatively connecting the at least one control rod and the CRDM. The coupling includes a first portion comprising a first material having a first density at room temperature, and a second portion comprising a second material having a second density at room temperature that is greater than the first density. In some embodiments the coupling includes a connecting rod including a hollow or partially hollow connecting rod tube comprising a first material having a first density and a filler disposed in the hollow or partially hollow connecting rod tube, the filler comprising a second material having a second density greater than the first density.

33 Claims, 11 Drawing Sheets

(56) References Cited

U.S. PATENT DOCUMENTS

| | | | |
|---|---|---|---|
| 4,076,584 A | 2/1978 | Golden et al. | |
| 4,363,778 A | 12/1982 | Abbott | |
| 4,560,532 A | 12/1985 | Barry et al. | |
| 4,655,990 A | 4/1987 | Leclercq | |
| 4,857,264 A | 8/1989 | Veronesi et al. | |
| 4,861,545 A | 8/1989 | Lippert | |
| 4,863,678 A | 9/1989 | Shockling et al. | |
| 4,876,061 A | 10/1989 | Ekeroth et al. | |
| 4,888,151 A | 12/1989 | Gjertsen et al. | |
| 4,928,291 A | 5/1990 | Mouesca et al. | |
| 4,993,864 A | 2/1991 | Gjertsen et al. | |
| 5,064,607 A | 11/1991 | Miller et al. | |
| 5,141,711 A | 8/1992 | Gjertsen et al. | |
| 5,183,626 A | 2/1993 | Denizou | |
| 5,200,138 A | 4/1993 | Ferrari | |
| 5,227,125 A | 7/1993 | Beneck et al. | |
| 5,361,279 A | 11/1994 | Kobsa et al. | |
| 5,606,582 A | 2/1997 | Bergamaschi | |
| 5,625,657 A | 4/1997 | Gallacher | |
| 5,841,824 A | 11/1998 | Graham | |
| 5,889,832 A | 3/1999 | Bonnamour et al. | |
| 6,091,790 A | 7/2000 | Ridolfo | |
| 6,236,699 B1 | 5/2001 | Ridolfo | |
| 6,333,955 B1 * | 12/2001 | Kawashima et al. | 376/233 |
| 6,418,178 B1 * | 7/2002 | Kobsa | 376/233 |
| 6,421,405 B1 | 7/2002 | Ridolfo | |
| 6,636,580 B2 | 10/2003 | Murakami et al. | |
| 6,865,242 B2 | 3/2005 | Barbe et al. | |
| 7,197,103 B2 | 3/2007 | Wintermann | |
| 7,243,959 B2 | 7/2007 | Wensel et al. | |
| 7,412,021 B2 | 8/2008 | Fetterman et al. | |
| 7,526,058 B2 | 4/2009 | Fawcett et al. | |
| 8,526,563 B2 | 9/2013 | Shargots et al. | |
| 2008/0253496 A1 | 10/2008 | McCarty et al. | |
| 2009/0122946 A1 | 5/2009 | Fawcett et al. | |

FOREIGN PATENT DOCUMENTS

| | | |
|---|---|---|
| JP | 2003-035790 | 2/2003 |
| TW | 574713 B | 2/2004 |

OTHER PUBLICATIONS

Japanese Office Action dated Mar. 3, 2015 for Application No. 2013-532817.

The First Office Action for Chinese Patent Application 201180004742.6, dated Apr. 16, 2015.

Office Action for Taiwanese Patent Application 100134394, dated Jun. 2, 2015.

* cited by examiner

CONTROL ROD/CONTROL ROD DRIVE MECHANISM COUPLINGS

BACKGROUND

The following relates to the nuclear power generation arts, nuclear reaction control arts, control rod operation arts, and related arts.

In known nuclear power plants, a nuclear reactor core comprises a fissile material having size and composition selected to support a desired nuclear fission chain reaction. To moderate the reaction, a neutron absorbing medium may be provided, such as light water ($H_2O$) in the case of light water reactors, or heavy water ($D_2O$) in the case of heavy water reactors. It is further known to control or stop the reaction by inserting "control rods" comprising a neutron-absorbing material into aligned passages within the reactor core. When inserted, the control rods absorb neutrons so as to slow or stop the chain reaction.

The control rods are operated by control rod drive mechanisms (CRDMs). In so-called "gray" control rods, the insertion of the control rods is continuously adjustable so as to provide continuously adjustable reaction rate control. In so-called "shutdown" control rods, the insertion is either fully in or fully out. During normal operation the shutdown rods are fully retracted from the reactor core; during a SCRAM, the shutdown rods are rapidly fully inserted so as to rapidly stop the chain reaction. Control rods can also be designed to perform both gray rod and shutdown rod functions. In some such dual function control rods, the control rod is configured to be detachable from the CRDM in the event of a SCRAM, such that the detached control rod falls into the reactor core under the influence of gravity. In some systems, such as naval systems, a hydraulic pressure or other positive force (other than gravity) is also provided to drive the detached control rod into the core.

To complete the control system, a control rod/CRDM coupling is provided. A known coupling includes a connecting rod having a lower end at which the control rod is secured. The upper portion of the connecting rod operatively connects with the CRDM. A known CRDM providing gray rod functionality comprises a motor driving a lead screw that is integral with or rigidly connected with the connecting rod, such that operation of the motor can drive the lead screw and the integral or rigidly connected connecting rod up or down in a continuous fashion. A known CRDM providing shutdown functionality is configured to actively hold the control rod in the lifted position (that is, lifted out of the reactor core); in a SCRAM, the active lifting force is removed and the control rod and the integral or connected connecting rod fall together toward the reactor core (with the control rod actually entering into the reactor core). A known CRDM providing dual gray/shutdown functionality includes a motor/lead screw arrangement, and the connection between the motor and the lead screw is designed to release the lead screw during SCRAM. For example, the motor may be connected with the lead screw via a separable ball nut that is actively clamped to the lead screw during normal (gray) operation, and separates in the event of a SCRAM so that the control rod, the connecting rod, and the lead screw SCRAM together (that is, fall together toward the reactor core).

Related application Ser. No. 12/722,662 titled "Control Rod Drive Mechanism For Nuclear Reactor" filed Mar. 12, 2010 and related application Ser. No. 12/722,696 titled "Control Rod Drive Mechanism For Nuclear Reactor" filed Mar. 12, 2010 are both incorporated herein by reference in their entireties. These applications disclose configurations in which the connection between the motor and the lead screw is not releasable, but rather a separate latch is provided between the lead screw and the connecting rod in order to effectuate SCRAM. In these alternative configurations the lead screw does not SCRAM, but rather only the unlatched connecting rod and control rod SCRAM together toward the reactor core while the lead screw remains engaged with the motor.

The CRDM is a complex device, and is typically driven electrically and/or hydraulically. In the case of shutdown or dual gray/shutdown rods, the control rod system including the CRDM may also be classified as a safety related component—this status imposes strict reliability requirements on at least the shutdown functionality of the CRDM.

To reduce cost and overall system complexity, it is known to couple a single CRDM with a plurality of control rods via an additional coupling element known as a "spider". In such a case all the control rods coupled with a single CRDM unit move together. In practice a number of CRDM units are provided, each of which is coupled with a plurality of control rods, so as to provide some redundancy. The spider extends laterally away from the lower end of the connecting rod to provide a large "surface area" for attachment of multiple control rods. The spider typically comprises metal tubes or arms extending outward from a central attachment point at which the spider attaches with the connecting rod. In some spiders, additional supporting cross-members may be provided between the radially extending tubes. The diameters (or more generally, sizes) of the metal tubes or arms comprising the spider are kept as low as practicable in order to minimize hydraulic resistance of the spider during SCRAM and to enable the control rod support structure to contact and cam against all control rods during raising or lowering of the control rods.

The coupling comprising the connecting rod and the spider is a relatively lightweight structure that minimizes material cost and weight-loading on the complex CRDM. For various reasons such as strength and robustness, low cost, manufacturability, and compatibility with the reactor vessel environment, both the connecting rod and the spider are usually stainless steel elements.

BRIEF SUMMARY

In one aspect of the disclosure, an apparatus comprises: at least one control rod comprising a neutron absorbing material; a control rod drive mechanism (CRDM) unit; and a control rod/CRDM coupling connecting the control rod and the CRDM unit such that the CRDM unit provides at least one of gray rod control and shutdown rod control for the at least one control rod; wherein the control rod/CRDM coupling has an average density greater than the density of stainless steel at room temperature.

In another aspect of the disclosure, an apparatus comprises a connecting rod of a control rod assembly of a nuclear reactor. The connecting rod includes a hollow or partially hollow connecting rod tube comprising a first material having a first density at room temperature, and a filler disposed in the hollow or partially hollow connecting rod tube, the filler comprising a second material having a second density at room temperature that is greater than the first density.

In another aspect of the disclosure, an apparatus comprises a nuclear reactor pressure vessel, and a control rod assembly including at least one movable control rod comprising a neutron absorbing material, a control rod drive mechanism (CRDM) for controlling movement of the at least one control rod, and a coupling operatively connecting the at least one control rod and the CRDM. The coupling includes at least a connecting rod comprising a hollow or partially hollow connecting rod tube comprising a first material having a first density at room temperature, and a filler disposed in the hollow or partially hollow connecting rod tube, the filler comprising a second material having a second density at room temperature that is greater than the first density.

In another aspect of the disclosure, an apparatus comprises a nuclear reactor pressure vessel, and a control rod assembly including at least one movable control rod comprising a neutron absorbing material, a control rod drive mechanism (CRDM) for controlling movement of the at least one control rod, and a coupling operatively connecting the at least one control rod and the CRDM. The coupling includes a first portion comprising a first material having a first density at room temperature, and a second portion comprising a second material having a second density at room temperature that is greater than the first density.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Disclosed herein is a paradigm shift in control rod/CRDM coupling assemblies. In existing control rod/CRDM coupling assemblies, the control rod is terminated by a lightweight, "spidery" spider having a minimal weight and surface area oriented broadside to the SCRAM direction. The spider is configured to provide a large "effective" area for attachment of control rods, but a small "actual" area contributing to hydraulic resistance during SCRAM. Both the spider and the connecting rod are stainless steel components so as to provide benefits such as strength and robustness, low cost, manufacturability, and compatibility with the reactor vessel environment.

Disclosed herein are control rod/CRDM coupling assemblies that include one or both of the following aspects: (i) replacement of the conventional lightweight spider with a terminal weighting element, and/or (ii) replacement of a substantial portion of the stainless steel of the control rod/CRDM coupling assembly with a denser material such as tungsten (optionally in a powdered or granulated form), molybdenum, tantalum, or so forth. The disclosed control rod/CRDM coupling assemblies are substantially heavier than conventional connecting rod/spider assemblies, which advantageously enhances the speed and reliability of gravitationally-induced SCRAM.

In the case of control rod/CRDM coupling assemblies employing the disclosed terminal weighting element, the increased weight provided by the terminal weighting element as compared with a conventional lightweight spider enables the terminal weighting element to optionally have a larger actual surface area broadside to the SCRAM direction (for example, in order to provide the additional weight) as compared with the conventional spider.

Figure 1:
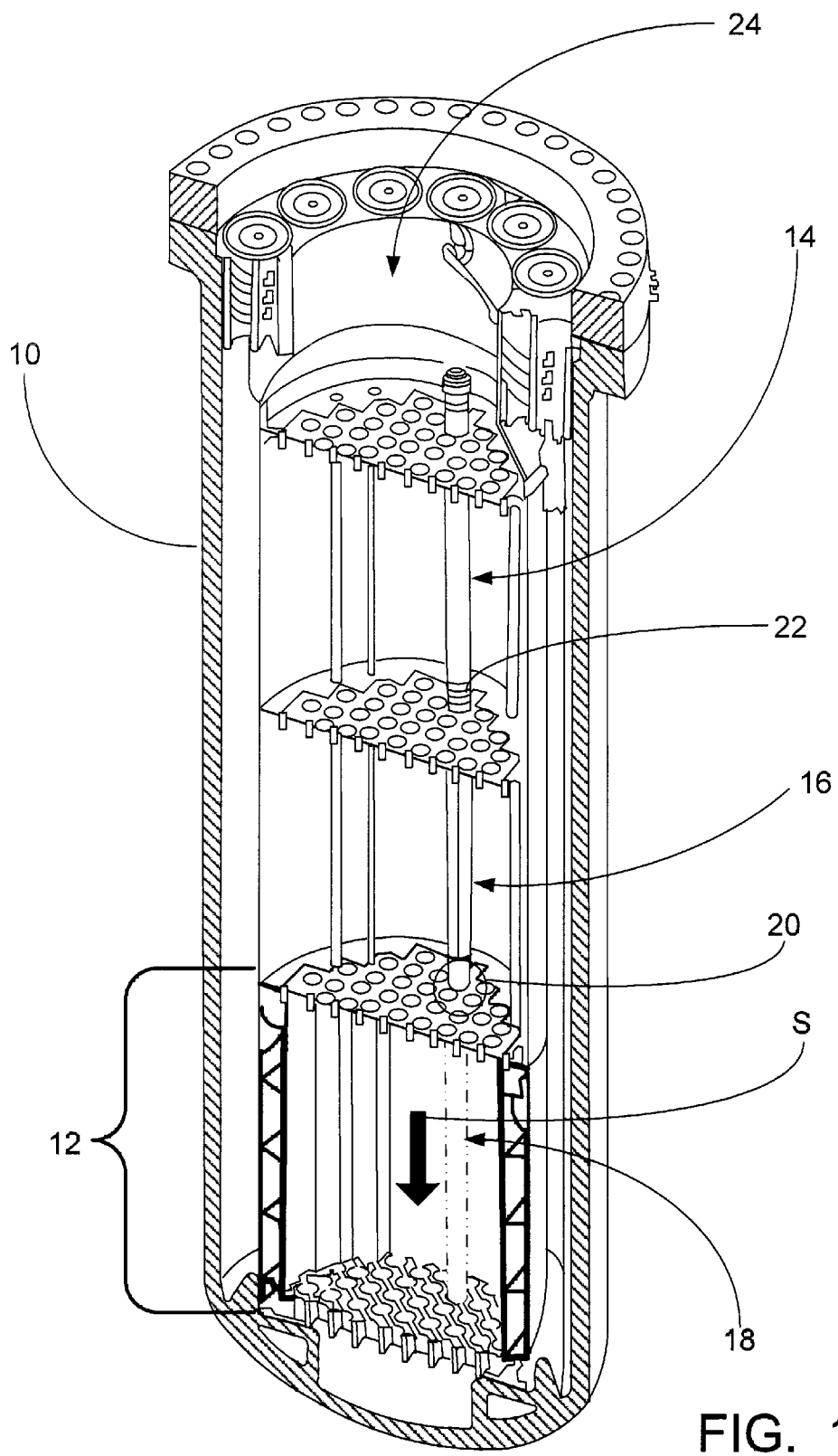
FIG. 1 diagrammatically shows a perspective sectional view a lower portion of an illustrative nuclear reactor pressure vessel including an illustrative control rod assembly (CRA).

With reference to FIG. 1, a relevant portion of an illustrative nuclear reactor pressure vessel 10 includes a core former 12 located proximate to a bottom of the pressure vessel 10. The core former 12 includes or contains a reactive core (not shown) containing or including radioactive material such as, by way of illustrative example, enriched uranium oxide (that is, $UO_2$ processed to have an elevated $^{235}U/^{238}U$ ratio). A control rod drive mechanism (CRDM) unit 14 is diagrammatically illustrated. The illustrative CRDM 14 is an internal CRDM that is disposed within the pressure vessel 10; alternatively, an external CRDM may be employed. FIG. 1 shows the single illustrated CRDM unit 14 as an illustrative example; however, more generally there are typically multiple CRDM units each coupled with a different plurality of control rods (although these additional CRDM units are not shown in FIG. 1, the pressure vessel 10 is drawn showing the space for such additional CRDM units).

Below the CRDM unit 14 is a control rod guide frame 16, which in the perspective view of FIG. 1 blocks from view the control rod/CRDM coupling assembly (not shown in FIG. 1). Extending below the guide frame 16 are a plurality of control rods 18. FIG. 1 shows the control rods 18 in their fully inserted position in which the control rods 18 are maximally inserted into the core former 12. In the fully inserted position, the terminal weighting element (or, in alternative embodiments, the spider) is located at a lower location 20 within the control rod guide frame 16 (and, again, hence not visible in FIG. 1). In the illustrative embodiment of FIG. 1, the CRDM unit 14 and the control rod guide frame 16 are spaced apart by a standoff 22 comprising a hollow tube having opposite ends coupled with the CRDM unit 14 and the guide frame 16, respectively, and through which the connecting rod (not shown in FIG. 1) passes.

FIG. 1 shows only a lower portion of the illustrative pressure vessel 10. In an operating nuclear reactor, an open upper end 24 of the illustration is connected with one or more upper pressure vessel portions that together with the illustrated lower portion of the pressure vessel 10 form an enclosed pressure volume containing the reactor core (indicated by the illustrated core former 12), the control rods 18, the guide frame 16, and the internal CRDM unit 14. In an alternative embodiment, the CRDM unit is external, located above the reactor pressure vessel. In such embodiments, the external CRDM is connected with the control rods by a control rod/CRDM coupling assembly in which the connecting rod extends through a portal in the upper portion of the pressure vessel.

Figure 2:
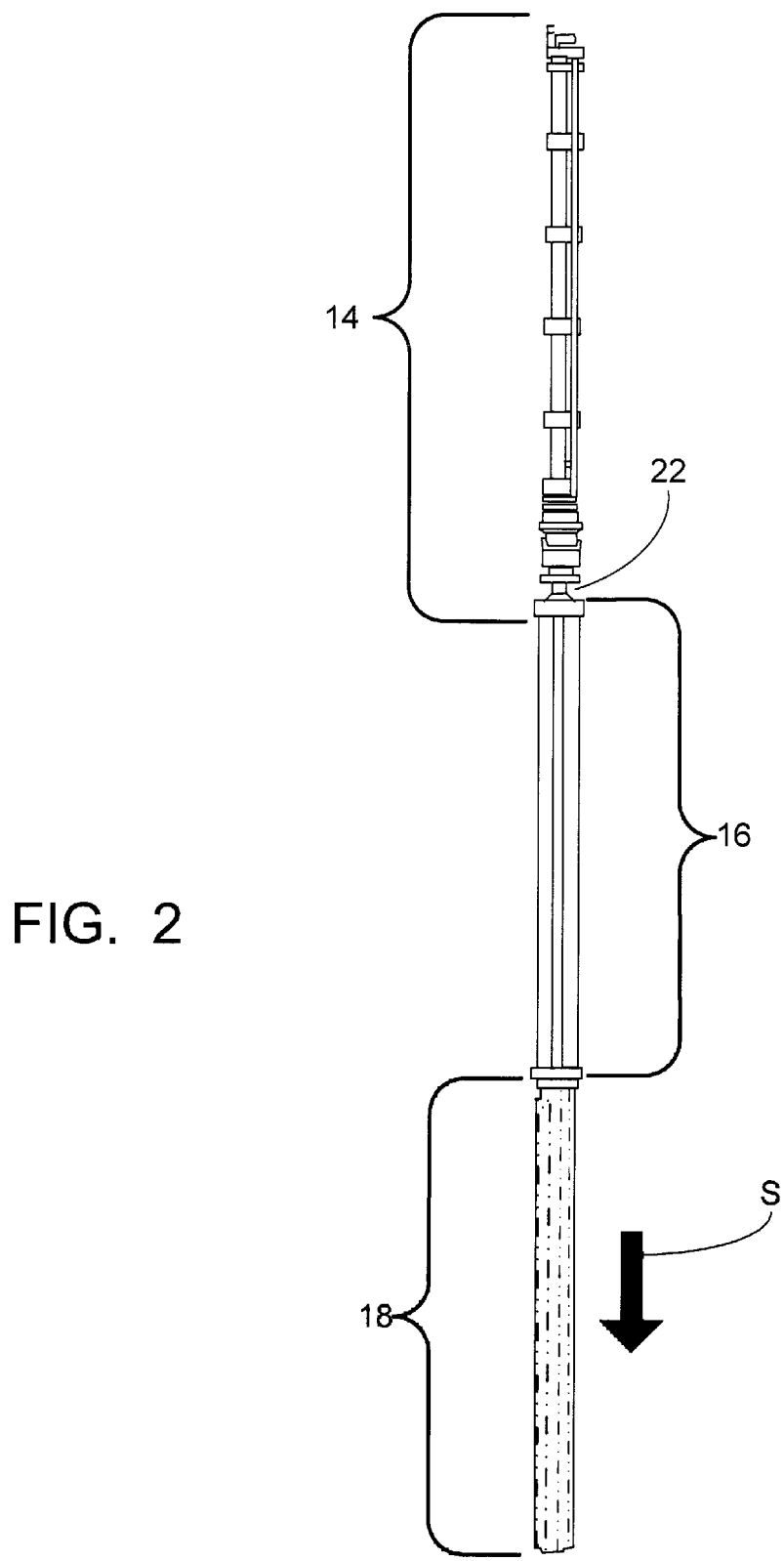
FIG. 2 diagrammatically shows a perspective view of the illustrative CRA of FIG. 1.

With reference to FIG. 2, the control assembly including the CRDM unit 14, the control rod guide frame 16, the intervening standoff 22, and the control rods 18 is illustrated isolated from the reactor pressure vessel. Again, the control rod/CRDM coupling assembly is hidden by the control rod guide frame 16 and the standoff 22 in the view of FIG. 2.

Figure 3:
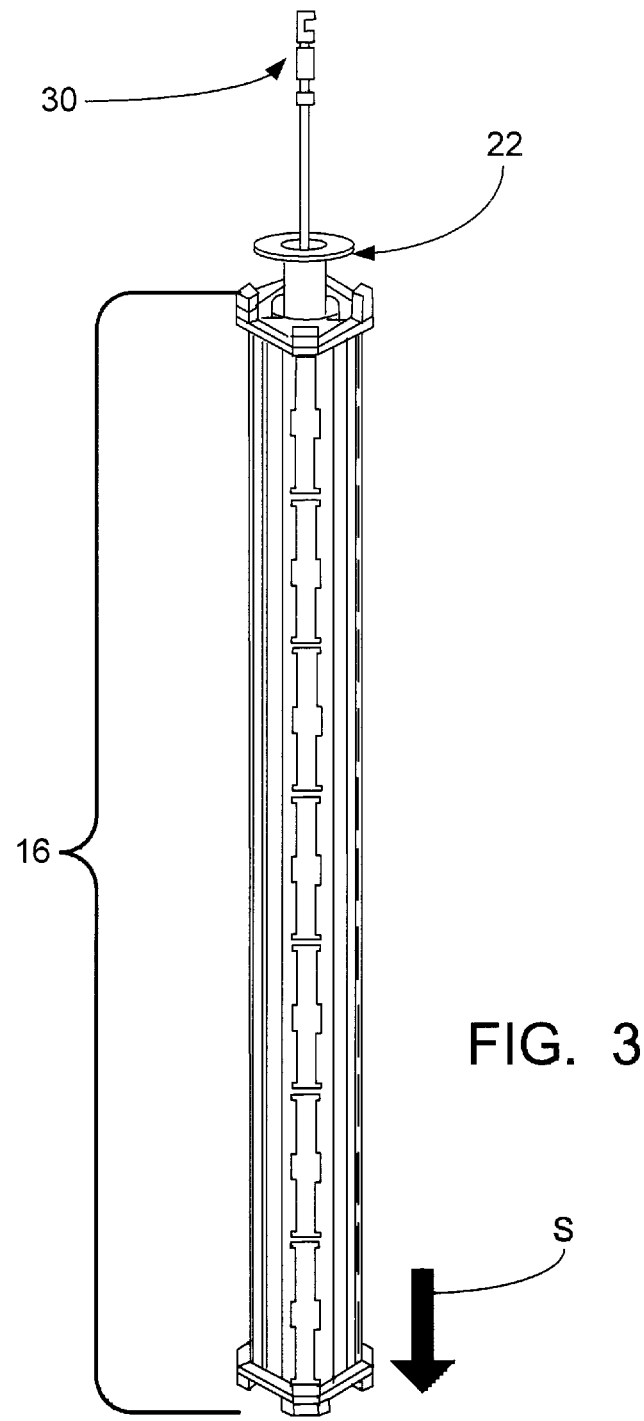
FIG. 3 diagrammatically shows a perspective view of the control rod guide frame with the CRDM unit removed so as to reveal an upper end of a connecting rod of the CRA.

With reference to FIG. 3, the control rod guide frame 16 and the standoff 22 is again illustrated, but with the CRDM unit removed so as to reveal an upper end of a connecting rod 30 extending upwardly above the standoff 22. If the CRDM unit has gray rod functionality, then this illustrated upper end of the connecting rod 30 engages with the CRDM unit to enable the CRDM unit to raise or lower the connecting rod 30 and, hence, the attached control rods 18 (not shown in FIG. 3). If the CRDM unit has shutdown rod functionality, then this illustrated upper end is detachable from the CRDM unit during SCRAM. In each of FIGS. 1-4, a SCRAM direction S is indicated, which is the downward direction of acceleration of the falling control rods in the event of a SCRAM.

Figure 4:
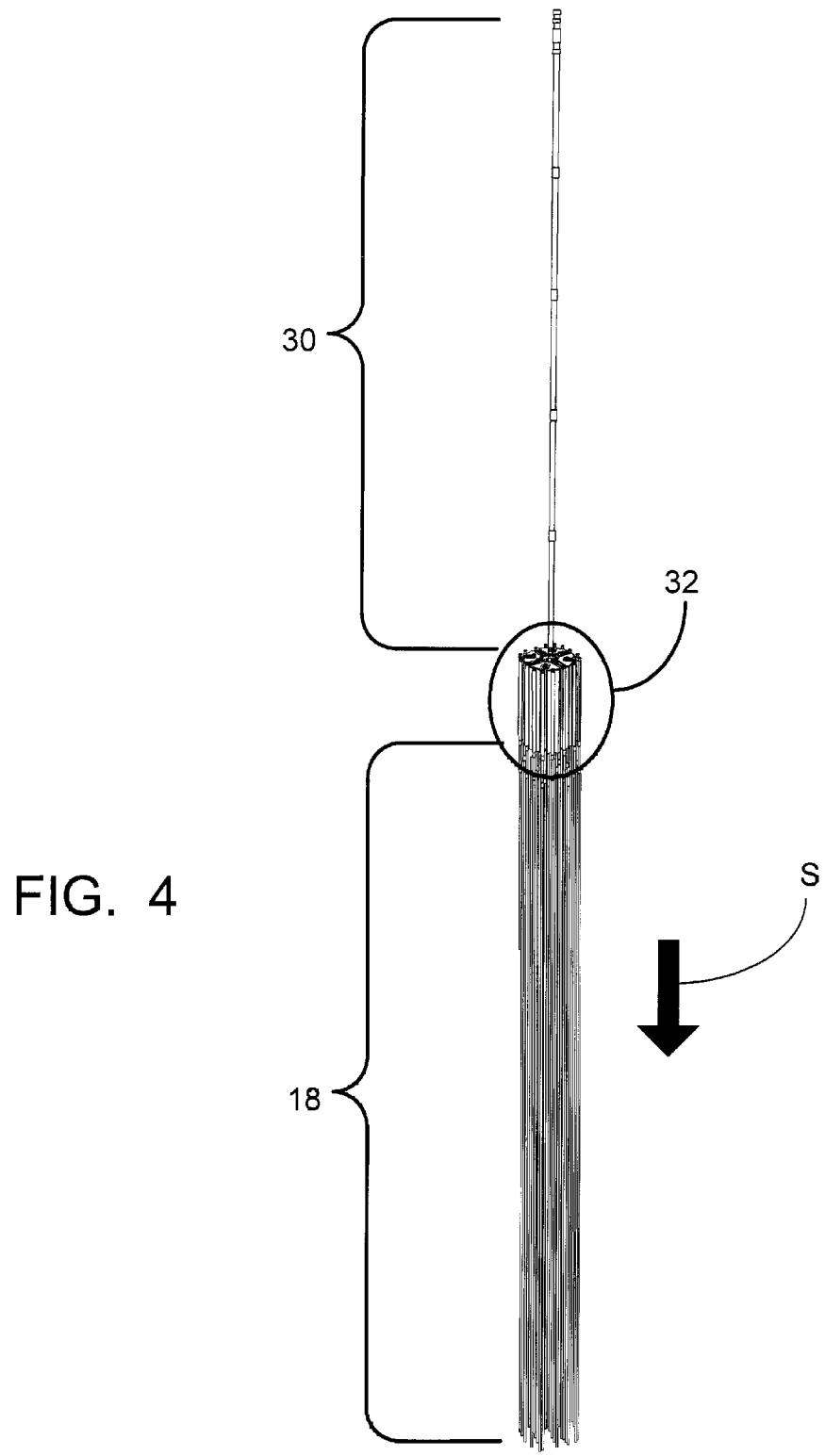
FIG. 4 diagrammatically shows a perspective view the control rods and the connecting rod of the CRA of FIGS. 1-3, with components that would occlude the view of these components removed.

With reference to FIG. 4, the control rods 18 and the connecting rod 30 are shown without any of the occluding components (e.g., without the guide frame, standoff, or CRDM unit). In the view of FIG. 4 an illustrative terminal weighting element 32 is visible, which provides connection of the plurality of control rods 18 with the lower end of the connecting rod 30. It will be noticed that, unlike a conventional spider, the terminal weighting element 32 has substantial elongation along the SCRAM direction S. The illustrated terminal weighting element 32 has the advantage of providing enhanced weight which facilitates rapid SCRAM; however, it is also contemplated to replace the illustrated terminal weighting element 32 with a conventional "spidery" spider.

Figure 5:
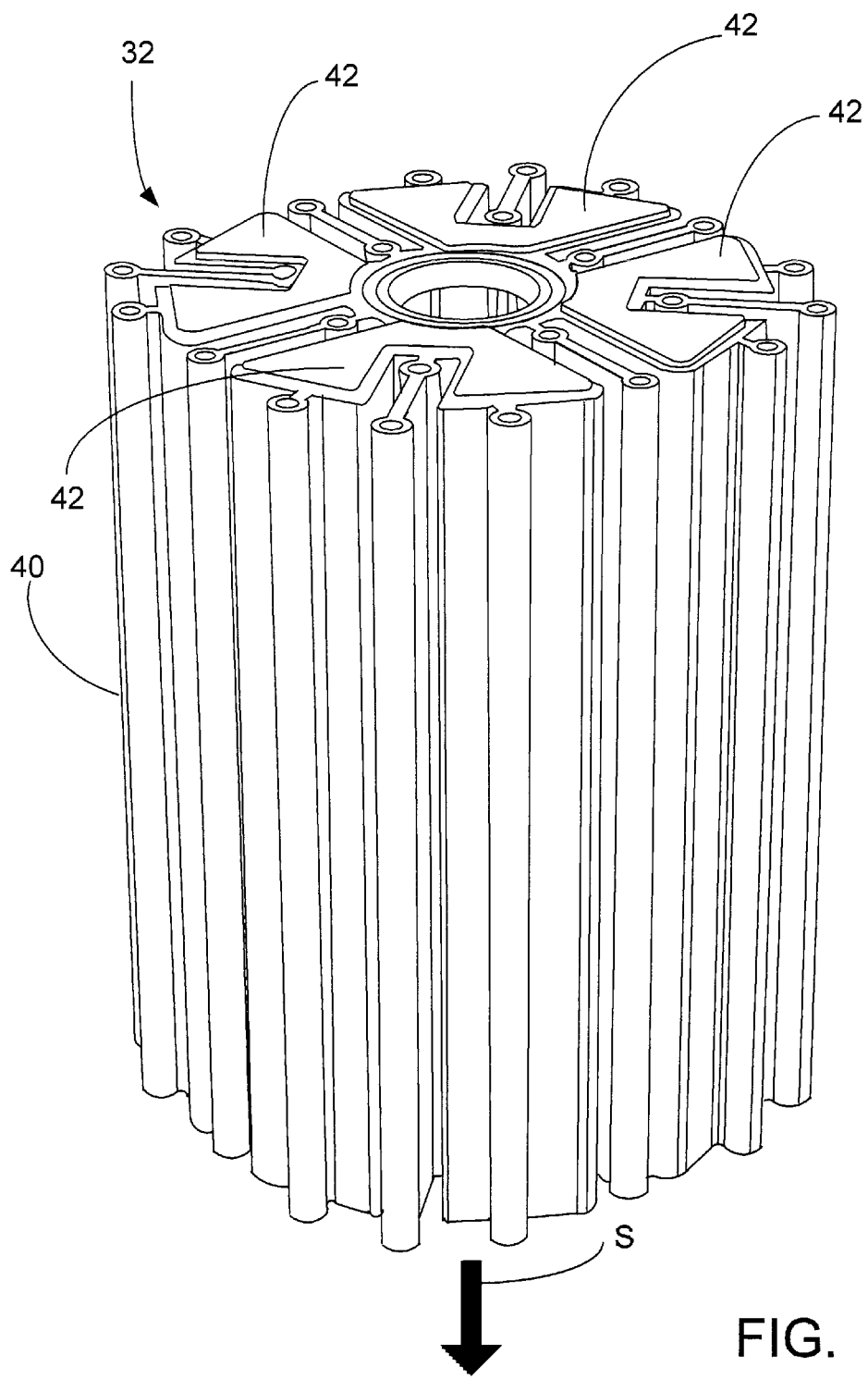
FIG. 5 diagrammatically shows a perspective view of the terminal weighting element of the CRA of FIGS. 1-4.
Figure 6:
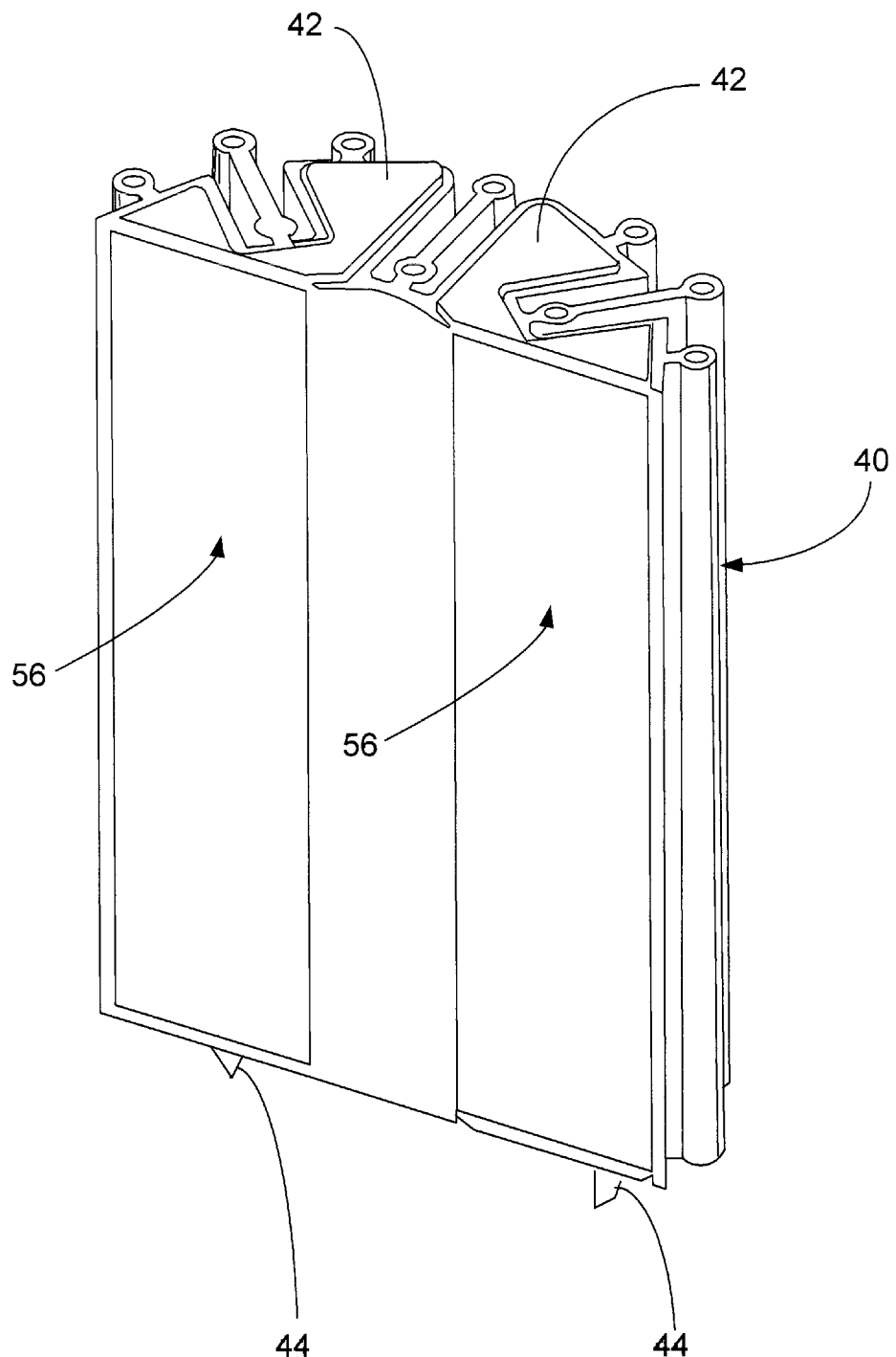
FIG. 6 diagrammatically shows a perspective sectional view of the terminal weighting element of FIG. 5.

With reference to FIGS. 5 and 6, a perspective view and a side-sectional perspective view, respectively, of the terminal weighting element 32 is shown. The terminal weighting element 32 includes a substantially hollow casing 40 having upper and lower ends that are sealed off by upper and lower casing cover plates 42, 44. Four upper casing cover plates 42 are illustrated in FIG. 5 and two of the upper casing cover plates 42 are shown in the side-sectional persective view of FIG. 6. The tilt of the perspective view of FIG. 5 occludes the lower cover plates from view, but two of the lower cover plates 44 are visible "on-edge" in the side-sectional view of FIG. 6. The illustrative terminal weighting element 32 includes four lower casing cover plates 44 arranged analogously to the four upper casing cover plates 42 illustrated in FIG. 5.

Figure 7:
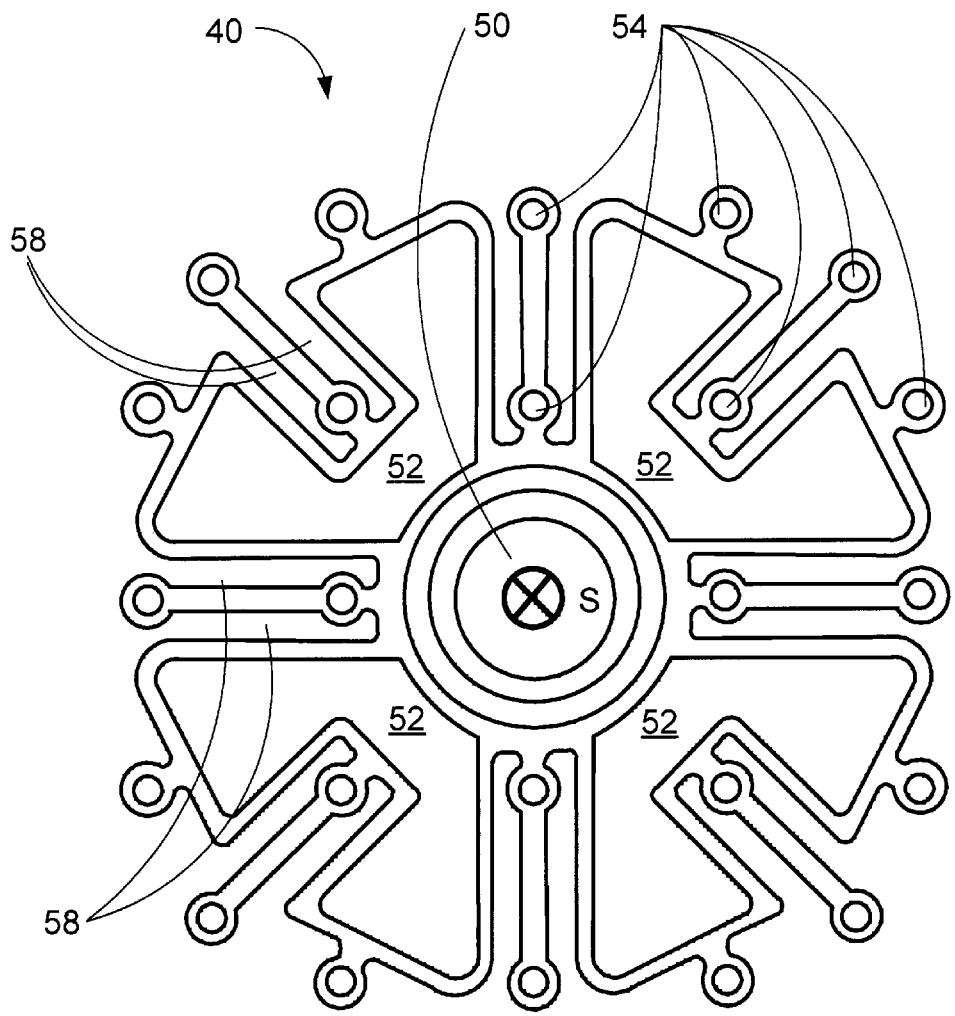
FIG. 7 diagrammatically shows a top view of a casing of the terminal weighting element of FIGS. 5 and 6.

Further visualization of the illustrative terminal weighting element 32 is provided by FIG. 7, which shows a top view of the hollow casing 40 with the cover plates omitted. As seen in FIG. 7, the hollow casing 40 is cylindrical having a cylinder axis parallel with the SCRAM direction S and a uniform cross-section transverse to the cylinder axis. That cross-section is complex, and defines a central passage 50 and four cavities 52 spaced radially at 90° intervals around the central passage 50. The cross-section of the hollow casing 40 also defines twenty-four small passages 54 (that is, small compared with the central passage 50), of which only some of the twenty-four small passages 54 are expressly labeled in FIG. 7. Comparison of FIG. 7 with FIGS. 5 and 6 show that the passages 50, 54 each pass completely through the casing 50 and are not covered by the upper or lower cover plates 42, 44.

Considering first the twenty-four small passages 54, these provide structures for securing the plurality of control rods 18. In some embodiments, each of the twenty-four of the small passages 54 retain a control rod, such that the plurality of control rods 18 consists of precisely twenty-four control rods. In other embodiments, one or more of the twenty-four small passages 54 may be empty or may be used for another purpose, such as being used as a conduit for in-core instrumentation wiring, in which case the plurality of control rods 18 consists of fewer than twenty-four control rods. It is to be further appreciated that the terminal weighting element 32 is merely an illustrative example, and that the terminal weighting element may have other cross-sectional configurations that provide for different numbers of control rods, e.g. more or fewer than twenty-four.

The four cavities 52 spaced radially at 90° intervals around the central passage 50 are next considered. The substantially hollow casing 40 and the upper and lower cover plates 42, 44 are suitably made of stainless steel, although other materials are also contemplated. The upper and lower cover plates 42, 44 seal the four cavities 52. As shown in the side-sectional view of FIG. 6, the four cavities 52 are filled with a filler 56 comprising a heavy material, where the term "heavy material" denotes a material that has a higher density than the stainless steel (or other material) that forms the hollow casing 40. For example, the filler 56 may comprise a heavy material such as tungsten (optionally in a powdered or granulated form), depleted uranium, molybdenum, or tantalum, by way of some illustrative examples. By way of illustrative example, stainless steel has a density of about 7.5-8.1 grams/cubic centimeter, while tungsten has a density of about 19.2 grams/cubic centimeter and tantalum has a density of about 16.6 grams per cubic centimeter. In some preferred embodiments, the heavy material comprising the filler 56 has a density that is at least twice the density of the material comprising the casing 40. In some preferred embodiments in which the casing 40 comprises stainless steel, the heavy material comprising the filler 56 preferably has a density that is at least 16.2 grams per cubic centimeter. (All quantitative densities specified herein are for room temperature.)

In some embodiments, the filler 56 does not contribute to the structural strength or rigidity of the terminal weighting element 32. Accordingly, heavy material comprising the filler 56 can be selected without consideration of its mechanical properties. For the same reason, the filler 56 can be in the form of solid inserts sized and shaped to fit into the cavities 52, or the filler 56 can be a powder, granulation, or other constitution. The cover plates 42, 44 seal the cavities 52, and so it is also contemplated for the heavy material comprising the filler 56 to be a material that is not compatible with the primary coolant flowing in the pressure vessel 10. Alternatively, if the heavy material comprising the filler 56 is a material that is compatible with the primary coolant flowing in the pressure vessel 10, then it is contemplated to omit the upper cover plates 42, in which case the cavities 52 are not sealed. Indeed, if the filler 56 is a solid material securely held inside the cavities 52, then it is contemplated to omit both the upper cover plates 42 and the lower cover plates 44.

Figure 8:
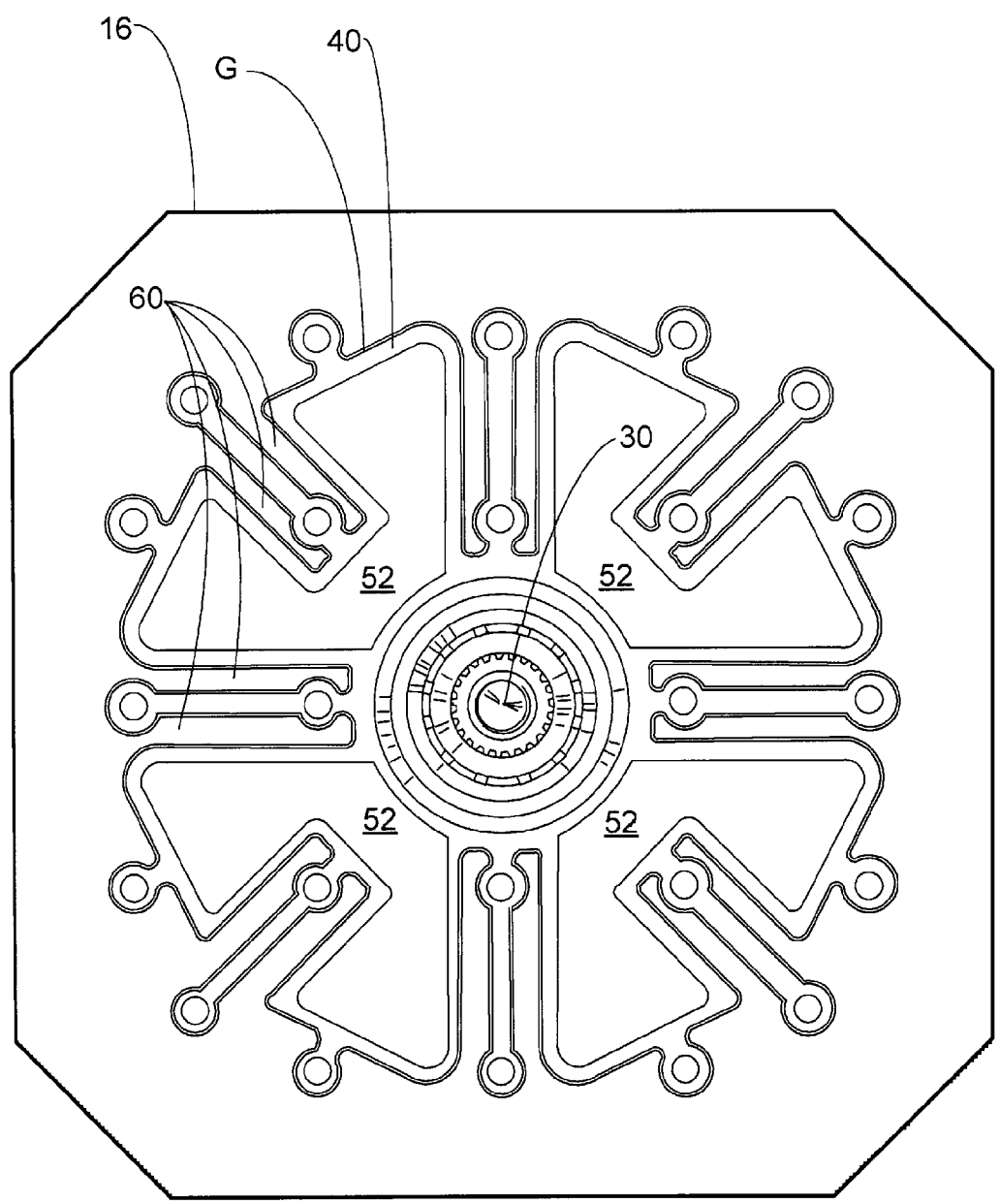
FIG. 8 diagrammatically shows a top view of the casing of the terminal weighting element of FIGS. 5-7 located in the control rod guide frame of the CRA of FIGS. 1-3.

With continuing reference to FIGS. 5-7 and with further reference to FIG. 8, the terminal weighting element 32 passes through the control rod guide frame 16 as the control rods 18 are raised or lowered by action of the CRDM unit 14. The cylindrical configuration with constant cross-section over the length of the terminal weighting element 32 along the SCRAM direction S simplifies this design aspect. Moreover, the control rod guide frame 16 should cam against each control rod 18 to provide the desired control rod guidance. Toward this end, the cross-section of the terminal weighting element 32 is designed with recesses 58 (some of which are labeled in FIG. 7). As shown in FIG. 8, into these recesses 58 fit mating extensions 60 of the control rod guide frame 16. A gap G also indicated in FIG. 8 provides a small tolerance between the outer surface of the terminal weighting element 32 and the proximate surface of the control rod guide frame 16. The twenty-four partial circular openings of the guide frame 16 which encompass the twenty-four small passages 54 of the terminal weighting element 32 are sized to cam against the control rods 18. For completeness, FIG. 8 also shows the connecting rod 30 disposed inside the central passage 50 of the terminal weighting element 32.

FIGS. 5-7 show that providing space for the four cavities 52 substantially increases the actual cross-sectional area of the terminal weighting element 32 (that is, the area arranged broadside to the SCRAM direction S), as compared with the actual cross-sectional area that could be achieved without these four cavities 52. In some embodiments, the "fill factor" for the cross-section oriented broadside to the SCRAM direction S (including the area encompassed by the cover plates 42, 44) is at least 50%, and FIG. 7 demonstrates that the fill factor is substantially greater than 50% for the illustrative terminal weighting element. Thus, the design of the terminal weighting element 32 is distinct from the "spidery" design of a typical spider, which is optimized to minimize the actual surface area broadside to the SCRAM direction S and generally has a fill factor of substantially less than 50% in order to reduce hydraulic resistance. In general, the SCRAM force achieved by the weight of the terminal weighting element 32 more than offsets the increased hydraulic resistance of the greater actual broadside surface area imposed by the four cavities 52.

Additional weight to overcome the hydraulic resistance and enhance SCRAM speed is obtained by elongating the terminal weighting element 32 in the SCRAM direction S. Said another way, a ratio of a length of the terminal weighting element 32 in the SCRAM direction S versus the largest dimension oriented broadside to the SCRAM direction S is optionally equal to or greater than one, and is more preferably equal to or greater than 1.2. The illustrative terminal weighting element 32 is not a generally planar element as per a typical spider, but rather is a volumetric component that provides substantial terminal weight to the lower end of the connecting rod 30.

The illustrative terminal weighting element 32 has a substantial advantage in that it places the filler 56 comprising heavy material between the radioactive core (contained in or supported by the core former 12 located proximate to the bottom of the pressure vessel 10 as shown in FIG. 1) and the CRDM unit 14. The heavy material comprising the filler 56 is a dense material which can generally be expected to be highly absorbing for radiation generated by the reactor core. High radiation absorption is a property of heavy materials such as tungsten, depleted uranium, molybdenum, or tantalum, by way of illustrative example. Thus, the filler 56 comprising heavy material provides radiation shielding that protects the expensive and (in some embodiments and to various extent) radiation-sensitive CRDM unit 14.

The elongation of the terminal weighting element 32 in the SCRAM direction S has additional benefits that are independent of providing weight. The elongation in the SCRAM direction S provides a longer length over which each control rod 18 can be secured to the terminal weighting element 32, and similarly provides a longer length over which the connecting rod 30 can be secured to the terminal weighting element 32. This provides a better mechanical couplings, and also provides enhanced stabilizing torque to prevent the control rods 18 from tilting. In general, the elongation of the terminal weighting element 32 in the SCRAM direction S provides a more rigid mechanical structure that reduces the likelihood of problematic (or even catastrophic) deformation of the connecting rod/terminal weighting element/control rods assembly.

Another advantage of the elongation of the terminal weighting element 32 in the SCRAM direction S is that it optionally allows for streamlining the terminal weighting element 32 in the SCRAM direction S. This variation is not illustrated; however, it is contemplated to modify the configuration of FIG. 5 (by way of illustrative example) to have a narrower lower cross-section and a broader upper cross section, with a conical surface of increasing diameter running from the narrower lower cross-section to the broader upper cross section. The small passages 54 for securing the control rods would remain oriented precisely parallel with the SCRAM direction S (and, hence, would be shorter for control rods located at the outermost positions). Such streamlining represents a trade-off between hydraulic resistance (reduced by the streamlining) and weight reduction caused by the streamlining.

Instead of the mentioned optional streamlining, the cross-section of the terminal weighting element can be otherwise configured to reduce hydraulic resistance. For example, the cross-section can include additional passages (not shown) analogous to the small passages 54, but which are not filled with control rods or anything else, and instead provide fluid flow paths to reduce the hydraulic resistance of the terminal weighting element during a SCRAM.

The illustrative terminal weighting element 32 provides a desired weight by a combination of the filler 56 comprising a heavy material (which increases the average density of the terminal weighting element 32 to a value greater than the average density of stainless steel) and the elongation of the terminal weighting element 32 (which increases the total volume of the terminal weighting element 32). The total mass (equivalent to weight) is given by the product of the volume and the average density. To achieve a desired weight, various design trade-offs can be made amongst: (1) the size or amount or volume of the filler 56; (2) the density of the heavy material comprising the filler 56; and (3) the elongation of the terminal weighting element 32.

In some embodiments, it is contemplated to achieve the desired weight by using a filler comprising a heavy material without elongating the terminal weighting element. In such embodiments, the terminal weighting element 32 may optionally have a conventional substantially planar and "spidery" spider configuration, in which the tubes or other connecting elements of the spider are partially or wholly hollow to define cavities containing the filler comprising a heavy material. Such a terminal weighting element can be thought of as a "heavy spider".

In other embodiments, it is contemplated to omit the filler material entirely, and instead to rely entirely upon elongation to provide the desired weight. For example, the illustrated terminal weighting element 32 can be modified by omitting the four cavities 52 and the filler 56. In this configuration the casing 40 can be replaced by a single solid stainless steel element having the same outer perimeter as the casing 40, with the top and bottom of the single solid stainless steel element defining (or perhaps better stated, replacing) the upper and lower casing cover plates 42, 44. Such embodiments omitting the filler comprising heavy material are suitably employed if the elongated terminal weighting element 32 made entirely of stainless steel provides sufficient weight. Such embodiments are also suitably employed if the weight of the terminal element is not a consideration, but other benefits of the elongated terminal element are desired, such as providing a longer length for secure connection with the control rods and/or the connecting rod 30, or providing an elongated geometry in the SCRAM direction S which is amenable to streamlining.

Various embodiments of the disclosed terminal weighting elements use a stainless steel casing that does not compromise the primary function of providing a suitable structure for coupling the control rods to the lower end of the connecting rod. At the same time, the stainless steel casing leaves sufficient void or cavity volume to allow a filler comprising a heavy material to be inserted. Although stainless steel is referenced as a preferred material for the casing, it is to be understood that other materials having desired structural characteristics and reactor pressure vessel compatibility can also be used. The filler comprising heavy material is suitably tungsten, depleted uranium, or another suitably dense material.

Various embodiments of the disclosed terminal weighting elements also have elongation in the SCRAM direction S. This elongated design is readily configured to fit into the control rod guide frame without any redesign (e.g., widening) of the guide frame, and hence does not impact the space envelope of the overall control rod assembly. The elongation is an adjustable design parameter, and can be set larger or smaller to provide the desired weight. Increasing the elongation generally increases the control rod assembly height, and this may impose an upper limit on the elongation for a particular reactor design. (This may be at least partially compensated by reducing the connecting rod length, but the connecting rod has a minimum length imposed by the desired maximum travel).

Another advantage of the disclosed terminal weighting element is that it can provide adjustable weight. For example, in some embodiments different CRDM units may be located at different heights, or may support control rods of different masses, such that the different translating assemblies associated with the different CRDM units are not identical. If it is deemed beneficial for all translating assemblies associated with the various CRDM units to have the same weight, then different amounts of the filler comprising heavy material can be included in the cavities 52 of different terminal weighting elements 32 in order to equalize the weights of the translating assemblies. In some cases this might result in some cavities 52 being only partially filled with the filler 56. Optionally, the unfilled space of the cavities 52 can be filled with a light weight filler material such as a stainless steel slug (not shown) or can contain a compressed loading spring (not shown) to prevent the filler 56 comprising heavy material from moving about within the cavities 52. The weight of the light weight filler or loading spring is suitably taken into account in selecting the amount of filler 56 of heavy material to achieve a desired overall weight. Equalizing weights of the various translating assemblies can be useful, by way of example, to allow the use of a common plunger or other kinetic energy absorbing element in each translating assembly. The kinetic energy absorbing element (not shown in FIGS. 5-8) is designed to provide a "soft stop" to a translating assembly undergoing SCRAM when the control rods reach the point of full (i.e., maximal) insertion.

The casing 40 of the illustrative terminal weighting element 32 acts as the structural part providing mechanical support. All loads associated with the coupling between the connecting rod 30 and the control rods 18 are transferred into the casing 40 which serves as the attachment location for each control rod.

Figure 9:
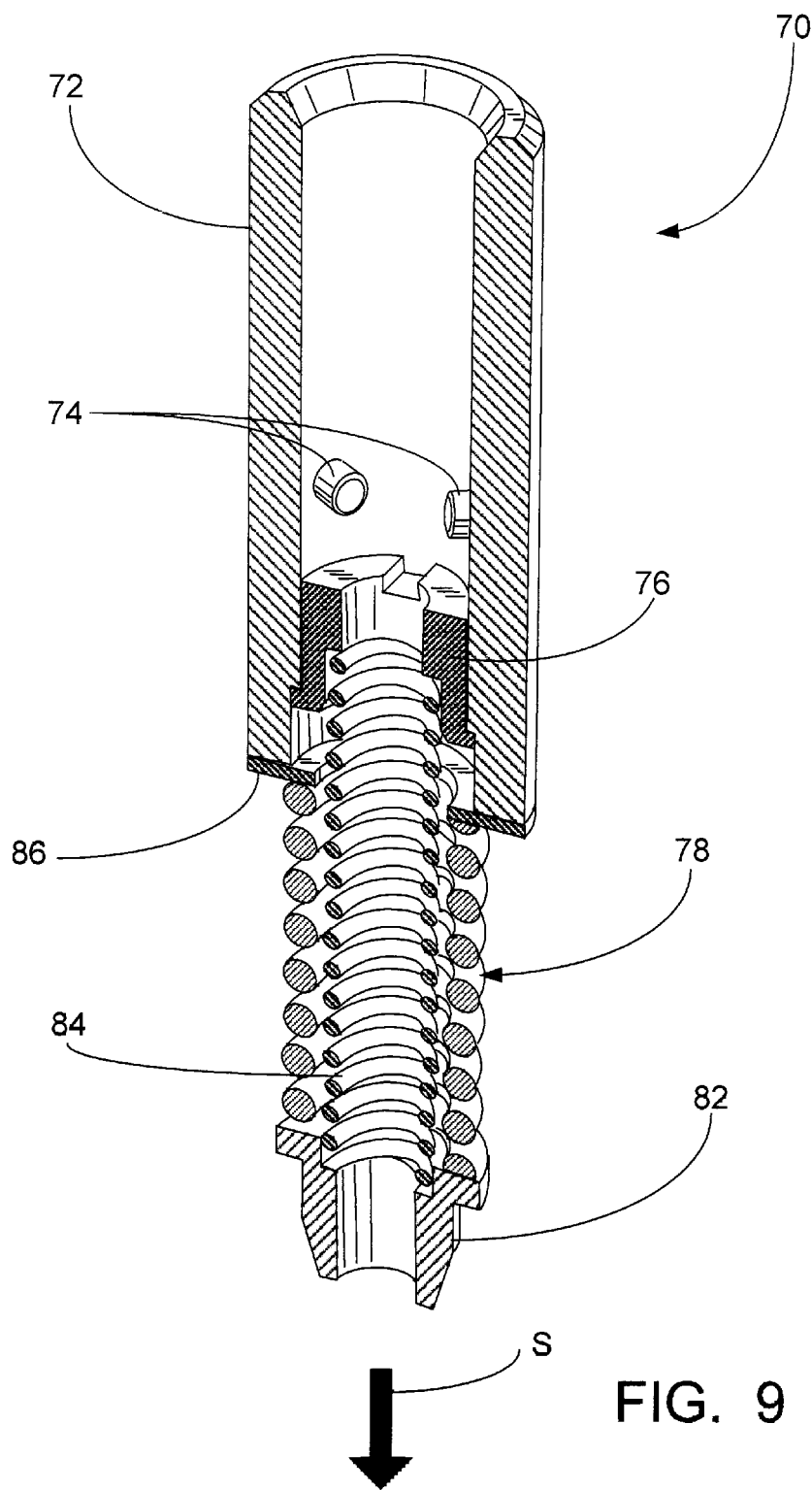
FIG. 9 diagrammatically shows a perspective sectional view of the J-Lock female attachment assembly housed or disposed in the central passage of the terminal weighting element of FIGS. 5-7.
Figure 10:
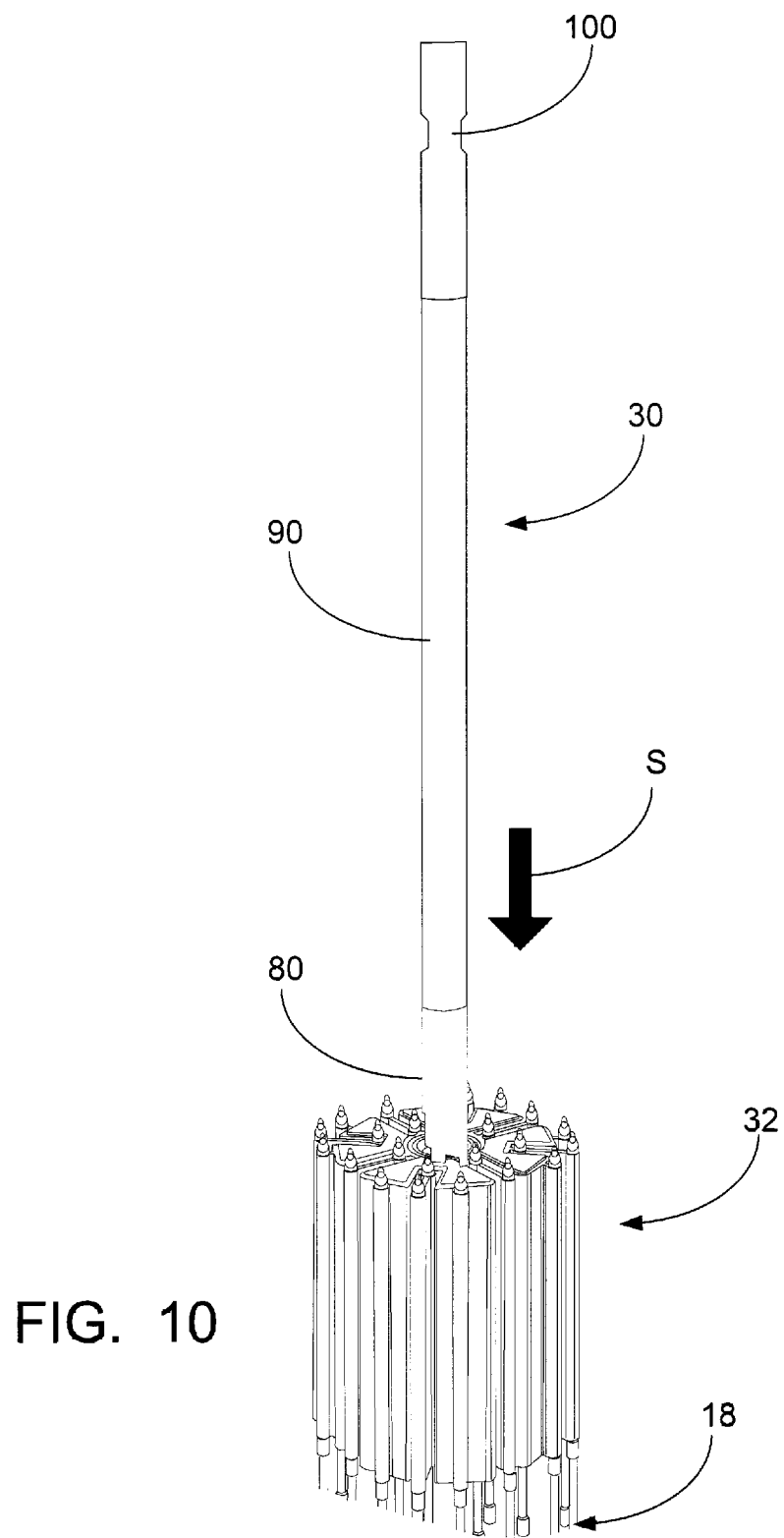
FIG. 10 diagrammatically shows a perspective view of the assembly of the connecting rod, terminal weighting element, and control rods including an upper portion of the J-Lock coupling.
Figure 11:
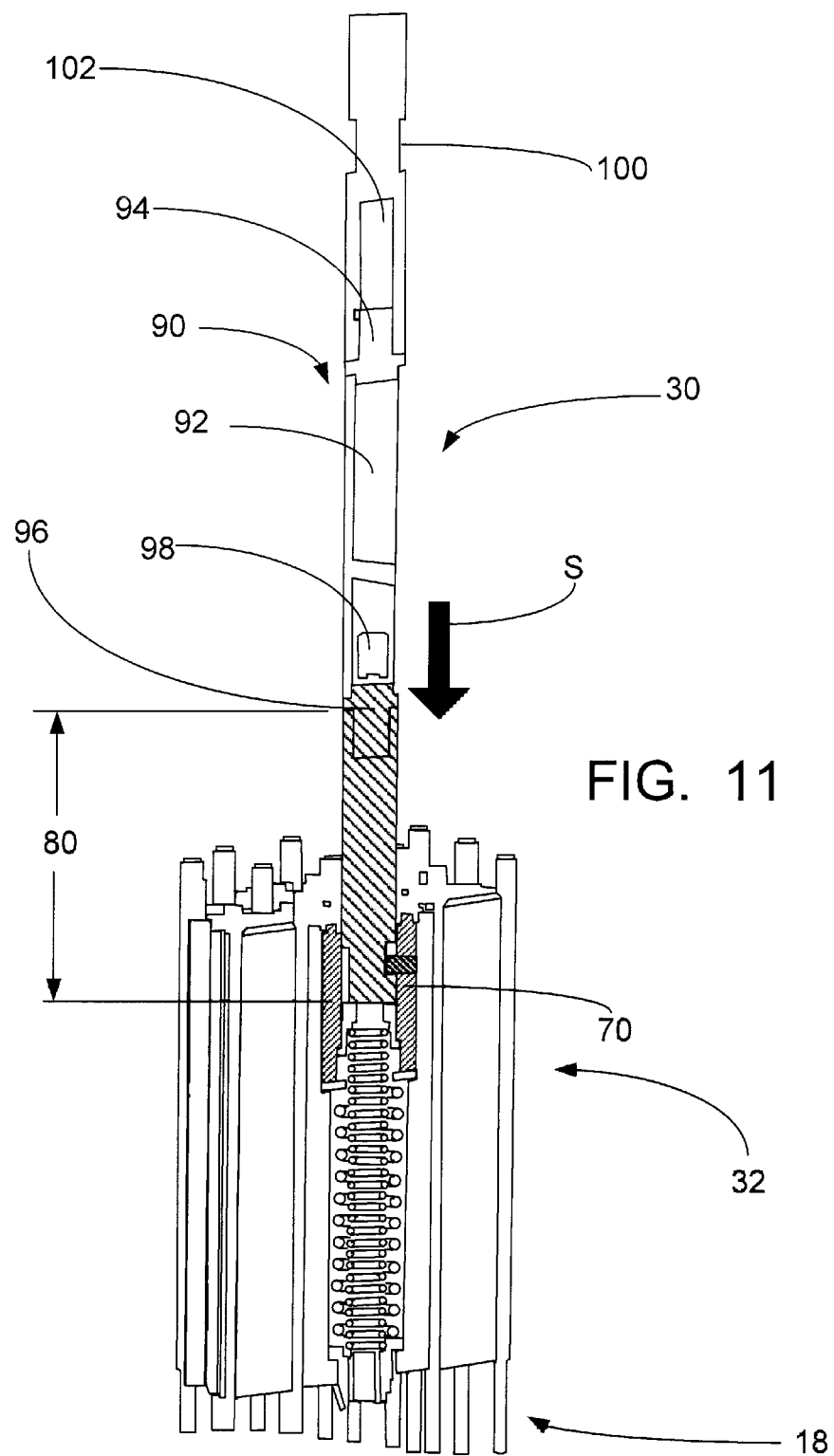
FIG. 11 diagrammatically shows a perspective sectional view of the assembly of the connecting rod, terminal weighting element, and control rods including details of the J-Lock coupling in its locked configuration.

With reference to FIGS. 9, 10, and 11, various attachment configurations can be used for securing the connecting rod 30 in the attachment passage 50 of the casing 40 of the terminal weighting element 32. In an illustrative example of one such attachment configuration, the central passage 50 of the casing 40 houses a J-Lock female attachment assembly 70, which is suitably coaxially disposed inside the central passage 50 of the casing 40. FIG. 9 illustrates a side sectional view of the J-Lock female attachment assembly 70, while FIG. 10 shows a side view of the connected assembly and FIG. 11 shows a side sectional view of the connected assembly. With particular reference to FIG. 9, the illustrative J-Lock female attachment assembly 70 includes a hub 72 which in the illustrative embodiment comprises a round cylinder coaxially welded or otherwise secured in the central passage 50 of the casing 40. Alternatively, the hub may be integral with or defined by an inside surface of the central passage 50. The hub 72 serves as an interface between the casing 40 and the J-Lock female attachment components, which include three J-Lock pins 74 (two of which visible in the sectional view of FIG. 9) disposed inside of the hub 72. These pins 74 provide the connection points for a J-Lock male attachment assembly 80 (see FIG. 11) disposed at the lower end of the connecting rod 30. A J-Lock plunger 76 and a J-Lock spring 84 keeps the J-Lock male attachment assembly 80 of the connecting rod 30 in place once it has been engaged with the terminal weighting element 32. (Locked arrangement shown in FIG. 11).

The illustrative J-Lock female attachment assembly 70 further includes a lower plunger 82, an inner spring 78, and a spring washer 86 which cooperate to absorb the impact of the lower translating assembly (that is, the translating combination of the control rods 18, the terminal weighting element 32, the connecting rod 30, and optionally a lead screw (not shown)) during a SCRAM.

The illustrative J-Lock connection between the lower end of the connecting rod 30 and the terminal weighting element 32 is an example. More generally, substantially any type of connection, including another type of detachable connection or a permanently welded connection or an integral arrangement, is contemplated. The J-Lock arrangement has the advantage of enabling the connecting rod 30 to be detached from the terminal weighting element 32 (and, hence, from the control rods 18) by a simple "push-and-twist" operation. This allows the connecting rod 30 to be moved separately from the remainder of the translating assembly (that is, the terminal weighting element 32 and the attached control rods 18) during refueling of the nuclear reactor.

The casing 40 of the terminal weighting element 32 can be manufactured using various techniques. In some embodiments manufacturing employing Electrical Discharge Machining (EDM) is contemplated. The EDM method operates on a solid block of stainless steel which is then cut to define the spider casing 40. Advantageously, EDM is fast and precise. Other contemplated methods include casting techniques or extrusion, both of which are fast and have low material cost.

The translating assembly comprising the control rods 18, terminal weighting element 32, connecting rod 30, and optionally a lead screw (not illustrated) is advantageously heavy in order to facilitate rapid and reliable SCRAM of the translating assembly toward the reactor core in the event of an emergency reactor shutdown. Toward this end, the terminal weighting element 32 is configured to be heavy. One way disclosed herein to achieve this is by increasing the average density of the terminal weighting element 32 to a value greater than that of stainless steel (or, more generally, increasing its average density to a value greater than that of the material comprising the casing 40) by the addition of the filler 56 comprising heavy material (where "heavy" denotes a density greater than that of the stainless steel or other material comprising the casing 40). Another way disclosed herein to achieve this is by elongating the terminal weighting element 32 in the SCRAM direction S. The illustrative terminal weighting element 32 employs both enhanced average density via filler 56 and elongation in the SCRAM direction S.

With reference to FIGS. 10 and 11, additional weight for the translating assembly is additionally or alternatively obtained by enhancing the density of the connecting rod 30. Toward this end, the illustrative connecting rod 30 includes a hollow (or partially hollow) connecting rod tube 90 which (as seen in the sectional view of FIG. 11) contains a filler 92 comprising heavy material. Thus, the connecting rod tube 90 serves the structural purpose analogous to the casing 40 of the terminal weighting element 32, while the filler 92 comprising heavy material serves a weighting (or average density-enhancing) purpose analogous to the filler 56 of the terminal weighting element 32. The hollow connecting rod tube 90 can be manufactured using various techniques, such as EDM (although longer tube lengths may be problematic for this approach), casting, extrusion, milling, or so forth.

In one suitable embodiment, the filler 92 comprising heavy material is in the form of tungsten slugs each having a diameter substantially coinciding with an inner diameter of the connecting rod tube 90 and being stacked in the connecting rod tube 90, with the number of stacked tungsten slugs being selected to achieve the desired weight. If the number of tungsten slugs is insufficient to fill the interior volume of the connecting rod tube 90 and it is desired to avoid movement of these slugs, then optionally the filler 92 is prevented from shifting by a suitable biasing arrangement or by filling the remaining space within the interior volume of the connecting rod tube 90 with a light weight material such as stainless steel slugs. In the illustrative example of FIG. 11, a biasing arrangement is employed, in which the interior volume of the connecting rod tube 90 is sealed off by upper and lower welded plugs 94, 96, and a compressed spring 98 takes up any slack along the SCRAM direction S that may be introduced by incomplete filling of the interior volume of the connecting rod tube 90 by the filler 92. Instead of tungsten, the heavy material comprising the filler may be depleted uranium, molybdenum, tantalum, or so forth, by way of some other illustrative examples. The filler 92 may comprise one or more solid slugs or rods, a powder, a granulation, or so forth. In the context of the connecting rod 30, the term "heavy material" refers to a material having a density that is greater than the density of the stainless steel or other material comprising the connecting rod tube 90. By way of illustrative example, stainless steel has a density of about 7.5-8.1 grams/cubic centimeter, while tungsten has a density of about 19.2 grams/cubic centimeter and tantalum has a density of about 16.6 grams per cubic centimeter. In some preferred embodiments, the heavy material comprising the filler 92 has a density that is at least twice the density of the material comprising the hollow connecting rod tube 90. In some preferred embodiments in which the hollow connecting rod tube 90 comprises stainless steel, the heavy material comprising the filler 92 preferably has a density that is at least 16.2 grams per cubic centimeter. (All quantitative densities specified herein are for room temperature.)

With continuing reference to FIGS. 10 and 11, the illustrative connecting rod 30 has an upper end that includes an annular groove 100 for securing with a latch of the CRDM unit 14 (latch not shown), and a magnet 102 for use in conjunction with a control rod position sensor (not shown). A suitable embodiment of the CRDM unit 14 including a motor/lead screw arrangement for continuous (gray rod) adjustment and a separate latch for detaching the connecting rod 30 from the CRDM unit 14 (with the lead screw remaining operatively connected with the motor) is described in related application Ser. No. 12/722,662 titled "Control Rod Drive Mechanism For Nuclear Reactor" filed Mar. 12, 2010 and related application Ser. No. 12/722,696 titled "Control Rod Drive Mechanism For Nuclear Reactor" filed Mar. 12, 2010, both of which are both incorporated herein by reference in their entireties.

Alternatively, in other embodiments a lead screw (not shown) is secured with or integral with the connecting rod tube 90, and the lead screw SCRAMs together with the connecting rod/terminal weighting element (or spider)/control rod (in other words, the lead screw forms part of the translating assembly during SCRAM). In some such alternative embodiments, the motor is suitably coupled with the lead screw by a separable ball nut that separates to release the lead screw and initiate SCRAM.

The illustrative connecting rod 30 includes eight components. The weight of the connecting rod 30 assembly is increased by using the hollow connecting rod tube 90. This may be only partially hollow—for example, only a lower portion may be hollow. Located inside the hollow connecting rod tube 90 is the filler 92 comprising heavy material. In some embodiments, the filler 92 comprises several smaller rods or slugs of tungsten. The number of tungsten rods or slugs inside the hollow connecting rod tube 90 is selected to achieve a desired weight. If different translating assemblies are employed with different CDRM units, the number of tungsten rods or slugs inside each of the hollow connecting rod tubes 90 may be different, and selected so as to ensure that each connecting rod of the several CDRM units has the same weight. This is advantagous since it follows that all of the CRDM units can be designed to lift a single weight independent of factors such as connecting rod length, control rod composition, or so forth.

As already noted, such weight "tuning" can also be achieved by adjusting the filler 56 in the terminal weighting element 32. If both fillers 56, 92 are employed, then the combined weight of the fillers 56, 92 can be tuned by adjusting the amount and/or density of either one, or both, of the fillers 56, 92. If the amount of weight tuning is expected to be small, then in some such embodiments the fillers 56, 92 may be solid elements of standard size/weight, and the total weight may then be trimmed by adding additional filler comprising heavy material in the form of a powder, granulation, small slug or slugs, or so forth.

If the interior volume of the hollow connecting rod tube 90 is only partially filled by the filler 92, then stainless steel rods or some other light weight filler (not shown) may be inserted into the remaining interior volume to fill complete the filling. Additionally or alternatively, the spring 98 or another mechanical biasing arrangement may be employed. It is contemplated to have the filler 92 arranged "loosely" in the rod tube 90; however, such an arrangement may complicate absorption of kinetic energy at the termination of a SCRAM drop.

The filler 92 generally has a lower coefficient of thermal expansion than the stainless steel (or other material) of the hollow connecting rod tube 90. The connecting rod 30 is assembled at room temperature, and then heated to its operating temperature. For a connecting rod having a length of, e.g. 250 centimeters or greater, the thermal expansion will result in the rod tube 90 increasing by an amount of order a few centimeters or more. The lower coefficient of thermal expansion of the filler 92 results in a substantially lower length increase of the filler 92. The spring 98 suitably compensates for this effect. Additionally, if the spring 98 is located below the filler 92 (as shown in FIG. 11), then it can assist in dissipating the kinetic energy of the filler 92 at the termination of the SCRAM drop.

As shown in the illustrative embodiment depicted in FIG. 11, the hollow connecting rod tube 90 may be less than the total length of the connecting rod 30. In the illustrated case, the connecting rod 30 includes additional length below the rod tube 90 corresponding to the J-Lock male attachment assembly 80, and also includes additional length above the rod tube 90 corresponding to an upper tube that includes the latch groove 100 and houses the position indicator magnet 102. The upper and lower welded plugs 94, 96 are optionally provided to seal off the interior volume of the hollow connecting rod tube 90. These plugs 94, 96 are attached to the upper and lower ends, respectively of the hollow connecting rod tube 90 so as to seal the filler 92 and the optional spring 98 inside. In the illustrative embodiment, the outer ends of the plugs 94, 96 are configured to facilitate connection of the upper connecting rod and the J-lock male attachment assembly 80, respectively.

The connecting rod 30 also has a substantial advantage in that it places the filler 92 comprising heavy material between the radioactive core (contained in or supported by the core former 12 located proximate to the bottom of the pressure vessel 10 as shown in FIG. 1) and the CRDM unit 14. The heavy material comprising the filler 92 is a dense material which can generally be expected to be highly absorbing for radiation generated by the reactor core. High radiation absorption is a property of heavy materials such as tungsten, depleted uranium, molybdenum, or tantalum, by way of illustrative example. Thus, the filler 92 comprising heavy material provides radiation shielding that protects the expensive and (in some embodiments and to various extent) radiation-sensitive CRDM unit 14. If both fillers 56, 92 are used, then both fillers contribute to this advantageous CRDM shielding effect.

The illustrative control rod/CRDM coupling includes a combination of (1) the terminal weighting element 32 including elongation and the filler 56, and (2) the connecting rod 30 including the filler 92.

In other control rod/CRDM coupling embodiments it is contemplated to include a combination of the terminal weighting element 32 including elongation and the filler 56 but coupled with a conventional solid stainless steel connecting rod (without the filler 92).

In other control rod/CRDM coupling embodiments it is contemplated to include a combination of a terminal element (which may or may not be a weighting element) including elongation but without the filler 56, coupled either with (i) the connecting rod 30 including the filler 92 or (ii) a conventional solid stainless steel connecting rod (without the filler 92).

In other control rod/CRDM coupling embodiments it is contemplated to include a combination of a terminal weighting element without elongation (for example, having a "spidery" topology similar to a conventional spider) but which includes the filler 56 disposed in hollow regions of the tubes or other members of the terminal weighting element, coupled either with (i) the connecting rod 30 including the filler 92 or (ii) a conventional solid stainless steel connecting rod (without the filler 92).

In other control rod/CRDM coupling embodiments it is contemplated to include a combination of (I) a conventional spider without elongation and without the filler 56 and (II) the connecting rod 30 including the filler 92.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
at least one control rod comprising a neutron absorbing material;
a control rod drive mechanism (CRDM) unit; and
a control rod/CRDM coupling connecting the control rod and the CRDM unit such that the CRDM unit provides at least one of gray rod control and shutdown rod control for the at least one control rod;
wherein the control rod/CRDM coupling includes a connecting rod having an average density greater than the density of stainless steel at room temperature, wherein the connecting rod comprises:
a hollow or partially hollow connecting rod tube;
a filler disposed in the interior volume of the hollow or partially hollow connecting rod tube, the filler comprising a material having a density greater than the density of stainless steel at room temperature, and
a welded plug sealing off the interior volume of the hollow or partially hollow connecting rod tube with the filler disposed in the interior volume.

2. The apparatus as set forth in claim 1, wherein the hollow or partially hollow connecting rod tube is made of stainless steel.

3. The apparatus as set forth in claim 1, wherein the filler has a density of at least 16.2 grams per cubic centimeter at room temperature.

4. The apparatus as set forth in claim 1, wherein the hollow or partially hollow connecting rod tube comprises a material having a first density and the material comprising the filler has a density that is at least twice the first density.

5. The apparatus as set forth in claim 1, wherein the connecting rod further comprises:
an additional element disposed in the hollow or partially hollow connecting rod tube, the additional element not being the filler comprising a material having a density greater than the density of stainless steel at room temperature, the additional element preventing the filler from moving inside the hollow or partially hollow connecting rod tube.

6. The apparatus as set forth in claim 1, wherein the connecting rod further comprises:
a compressed spring disposed in the hollow or partially hollow connecting rod tube and pressing against the filler.

7. The apparatus as set forth in claim 6, wherein the spring is disposed below the filler in the hollow or partially hollow connecting rod tube such that the spring at least contributes to dissipating kinetic energy accrued by the filler during a SCRAM.

8. The apparatus as set forth in claim 3, wherein the hollow or partially hollow connecting rod tube is made of stainless steel.

9. The apparatus as set forth in claim 2, wherein the filler comprises a material selected from the group consisting of tungsten, depleted uranium, molybdenum, and tantalum.

10. The apparatus as set forth in claim 1, wherein the filler comprises a material selected from the group consisting of tungsten, depleted uranium, molybdenum, and tantalum.

11. An apparatus comprising:
   at least one control rod comprising a neutron absorbing material;
   a control rod drive mechanism (CRDM) unit; and
   a connecting rod having its lower end connected with the control rod and its upper end connected with the CRDM unit such that the CRDM unit provides at least one of gray rod control and shutdown rod control for the at least one control rod;
   wherein the connecting rod comprises (i) a hollow or partially hollow stainless steel rod tube having a length of 250 centimeters or greater and (ii) a filler material disposed inside the hollow or partially hollow stainless steel rod tube, the filler material having a density greater than the density of stainless steel at room temperature.

12. The apparatus of claim 11 wherein the at least one control rod comprises a plurality of control rods and the apparatus further comprises:
   a spider via which the lower end of the connecting rod is connected with the plurality of control rods.

13. An apparatus comprising:
   at least one control rod comprising a neutron absorbing material;
   a control rod drive mechanism (CRDM) unit;
   a connecting rod having its lower end connected with the control rod and its upper end connected with the CRDM unit such that the CRDM unit provides at least one of gray rod control and shutdown rod control for the at least one control rod; and
   a detachable attachment assembly via which the lower end of the connecting rod connects with the at least one control rod, the detachable attachment assembly including mating male and female attachment components;
   wherein the connecting rod comprises (i) a hollow or partially hollow rod tube made of a rod tube material and (ii) a heavy material disposed inside the hollow or partially hollow rod tube, the heavy material having a density greater than the density of the rod tube material, the heavy material disposed inside the hollow or partially hollow rod tube being different from the male and female attachment components of the detachable attachment assembly.

14. The apparatus of claim 13 wherein the rod tube material is stainless steel.

15. The apparatus of claim 14 wherein the heavy material comprises tungsten.

16. The apparatus of claim 14 wherein the heavy material comprises depleted uranium.

17. The apparatus of claim 14 wherein the heavy material comprises molybdenum.

18. The apparatus of claim 14 wherein the heavy material comprises tantalum.

19. The apparatus of claim 13 wherein the heavy material comprises tungsten.

20. The apparatus of claim 13 wherein the heavy material comprises depleted uranium.

21. The apparatus of claim 13 wherein the heavy material comprises molybdenum.

22. The apparatus of claim 13 wherein the heavy material comprises tantalum.

23. The apparatus of claim 13 wherein the heavy material has a density that is at least twice the density of the rod tube material.

24. The apparatus of claim 23 wherein the rod tube material is stainless steel.

25. The apparatus of claim 13 wherein the at least one control rod comprises a plurality of control rods and the apparatus further comprises:
   a spider via which the lower end of the connecting rod is connected with the plurality of control rods, the spider including the female attachment component of the detachable attachment assembly and the lower end of the connecting rod including the male attachment component of the detachable attachment assembly.

26. The apparatus as set forth in claim 1, wherein the hollow or partially hollow connecting rod tube has a length of 250 centimeters or greater.

27. The apparatus as set forth in claim 13, wherein the hollow or partially hollow connecting rod tube has a length of 250 centimeters or greater.

28. The apparatus as set forth in claim 11, wherein the connecting rod further comprises:
   a welded plug sealing off the interior volume of the hollow or partially hollow connecting rod tube.

29. The apparatus as set forth in claim 13, wherein the connecting rod further comprises:
   a welded plug sealing off the interior volume of the hollow or partially hollow connecting rod tube.

30. The apparatus as set forth in claim 1, further comprising:
   a detachable attachment assembly via which a lower end of the connecting rod connects with the at least one control rod, the detachable attachment assembly including mating male and female attachment components;
   wherein the filler disposed in the hollow or partially hollow rod tube is different from the male and female attachment components of the detachable attachment assembly.

31. The apparatus as set forth in claim 11, further comprising:
   a detachable attachment assembly via which the lower end of the connecting rod connects with the at least one control rod, the detachable attachment assembly including mating male and female attachment components;
   wherein the filler disposed inside the hollow or partially hollow stainless steel rod tube is different from the male and female attachment components of the detachable attachment assembly.

32. An apparatus comprising:
   at least one control rod comprising a neutron absorbing material;
   a control rod drive mechanism (CRDM) unit; and
   a connecting rod having its lower end connected with the control rod and its upper end connected with the CRDM unit such that the CRDM unit provides at least one of gray rod control and shutdown rod control for the at least one control rod;
   wherein the connecting rod comprises (i) a hollow or partially hollow rod tube made of a rod tube material and (ii) a heavy material comprising depleted uranium disposed inside the hollow or partially hollow rod tube, the heavy material having a density greater than the density of the rod tube material.

33. The apparatus of claim 32 wherein the rod tube material is stainless steel.

* * * * *